United States Patent [19]
Harris

[11] Patent Number: 6,051,269
[45] Date of Patent: Apr. 18, 2000

[54] BASIC TREATMENT FOR IMPROVING HANDLEABILITY AND DIGESTIBILITY OF WHOLE COTTONSEED

[75] Inventor: Joseph M. Harris, The Woodlands, Tex.

[73] Assignee: Westway Trading Corporation, New Orleans, La.

[21] Appl. No.: 09/148,225

[22] Filed: Sep. 4, 1998

[51] Int. Cl.$^7$ .............................. D01C 1/00; A23B 9/30; A23K 1/14; A23K 3/03

[52] U.S. Cl. ............................ 426/635; 426/53; 426/54; 426/630; 19/40; 19/66 CC

[58] Field of Search ................................ 19/40, 48, 66 R, 19/66 CC; 56/33; 47/5, DIG. 9; 424/195.1; 426/53, 54, 635, 630, 807; 800/314

[56] References Cited

U.S. PATENT DOCUMENTS

| | | | |
|---|---|---|---|
| 4,729,896 | 3/1988 | Sawhill | 426/2 |
| 4,921,674 | 5/1990 | Enos | 422/28 |
| 5,112,637 | 5/1992 | Hron, Sr. et al. | 426/629 |
| 5,204,102 | 4/1993 | Coles et al. | 424/195.1 |
| 5,363,754 | 11/1994 | Coles et al. | 99/484 |
| 5,750,466 | 5/1998 | Wedegaertner et al. | 504/100 |

OTHER PUBLICATIONS

"Digestibility of Alkali–Treated Wheat Straw Measured In Vitro or In Vivo Using Holstein Heifers," *J. Anim. Sci.,* 1995, pp. 73:3258–65.

"Alkali–Treated Wheat Straw for Diary Cattle," *Microsoft Internet Explorer,* Jul. 1998, p. 1.

"Cottonseed–treatment plant ships first test loads," *Feedstuffs,* Jan. 1997, pp. 25–26.

*Primary Examiner*—Keith Hendricks
*Attorney, Agent, or Firm*—Crutsinger & Booth

[57] ABSTRACT

A process of treating whole cottonseed to improve the handleability and digestibility of the cottonseed is provided. In general, the process comprises the steps of: (a) adjusting the pH to equal or greater than eight of an aqueous composition having a sugar concentration of at least 5 percent by weight; and (b) applying the aqueous composition to whole cottonseed. According to another aspect of the invention, the process further comprises the step of drying the whole cottonseed after applying the aqueous composition. According to a modified process of treating whole cottonseed to improve the handleability and digestibility of the cottonseed, the process comprises the steps of: (a) applying an aqueous sugar composition having a sugar concentration of at least 5 percent by weight to the whole cottonseed; and (b) applying a basic aqueous solution having a pH equal to or greater than eight to the whole cottonseed. According to yet another aspect of the invention, the treated whole cottonseed product of the process is used as a new feed ingredient for animal feed, particularly a ruminant.

27 Claims, No Drawings

BASIC TREATMENT FOR IMPROVING HANDLEABILITY AND DIGESTIBILITY OF WHOLE COTTONSEED

TECHNICAL FIELD

The present invention provides a process for treating whole cottonseed to improve both its handleability and digestibility, which improves the usefulness of whole cottonseed for use in animal feed, especially animal feed for ruminants.

BACKGROUND OF THE INVENTION

Whole cottonseed is produced in large quantities from cotton cultivation. After the cotton has been picked from the boll of the cotton plant, it is processed through a cotton gin that combs through the cotton to separate the seeds from the cotton fibers. The whole cottonseed that is separated from the cotton is covered with a coat of residual cotton fibers, known as "linters" or "fuzz," giving the cottonseed a fuzzy appearance. Thus, whole cottonseed is sometimes referred to as fuzzy cottonseed, fluffy cottonseed, or linter-bearing cottonseed.

The cotton gin and the textile producing machinery of the late industrial revolution lead to a dramatic increase of cotton production. At first, the cottonseed was considered to be a waste product of producing cotton and of little commercial value except to the extent needed as planting seed for future crops. In the middle of the nineteenth century, it was discovered that cottonseed could be squeezed to yield a useful oil. Later, the residue of the oil making process was used as a feed supplement for grazing animals. Whole cottonseed has become recognized as being a desirable animal feedstuff because of its rich combination of nutritive protein, fibre, and fat contents, and its availability at a reasonable cost.

The livestock feed industry's requirements for cottonseed are different from the requirements of the planting seed industry. For example, relatively speaking, planting seed is characterized by high quality, high cost, and low volume. Cottonseed for use as a feed, in contrast, is characterized by lesser quality, lower cost, and high volume. Therefore, a high cost per unit volume for improving the flow characteristics of planting seed may be acceptable whereas it would not be acceptable for livestock feed.

Whole cottonseed, however, has some undesirable physical characteristics that make the handling of this feed ingredient difficult. For example, the material has a very low bulk density, which means that it has a large volume for a given weight of material, so that handling and shipping of the material is inefficient. Handling whole cottonseed in most processing equipment used in a feed mill is also difficult. The many soft cotton fibers on the seeds tend to become entangled and cause clumping of the seeds, resulting in very poor flowability. This trait is sometimes referred to as "bridging" of the cottonseeds across an opening, which tends to close or bridge the opening and prevent flow of the material. Thus, the handling characteristics of whole cottonseed are similar to those of common cotton balls available from a retail drug store. The poor flowability characteristics of whole cottonseed creates a need for specialized equipment to transport and handle the cottonseed.

In the past, efforts at delinting the cottonseed have included mechanical or chemical delinting, but the additional processing for this purpose has generally negated the commercial viability of whole cottonseed as an inexpensive feedstuff.

U.S. Pat. No. 5,204,102 issued Apr. 20, 1993 and having Richard G. Coles and Ian J. Broadfoot as named inventors, discloses a process and apparatus for treating cottonseed to make an animal feedstuff. The process preferably includes the steps of initially partially delinting the whole cottonseed by singeing the cottonseed in an open flame and removing the charcoal that is produced during such singeing by abrasion such as passing the flame delinted seed through a buffing trommel. The partially delinted cottonseed is then coated with a "binder" and a "filler" combination to cement the cotton fibers to the seed and provide a cementitious base to which the filler is adhered so as to completely encapsulate the seed and provide an integral flowable product. The binder initially has a sticky or tacky consistency but is capable of setting to a solid state when mixed with the filler. The suitable "binders" are gums such as gum arabic, starches, lignasite, and molasses. The suitable "fillers" are inert mineral powders such as calcium carbonate, lime, diatomaceous earth, forms of clay such as bentonite and kaolin, extruded or textured proteins such as those derived from soybeans, and ground cereal grains such as corn, wheat, barely, maize, and sorghum, and mixtures thereof. Optional "additives" to the coating are generally described as vitamins, minerals, trace elements, veterinarian products for the prevention, control or eradication of disease, and growth stimulating factors. U.S. Pat. No. 5,363,754 issued Nov. 15, 1994 and having Richard G. Coles and Ian J. Broadfoot as named inventors is a continuation-in-part of U.S. Pat. No. 5,204,102 that expands its definition of "binders" to include a syrup such as corn syrup.

U.S. Pat. No. 5,750,466 issued May 12, 1998 and having Thomas C. Wedegaertner, Thomas D. Valco, and William F. Lalor as named inventors discloses coating linter-bearing cottonseed with starch and one or more biologically related materials generally described as being selected from the group consisting of vitamins, feed supplements, oils, fats, ores, rodent repellants, insect repellants, medications, anti-germination agents, and preservatives for use as an animal feed and as planting stock. The starch coating is intended to allow the cottonseed to be used in conventional feed handling and seed planting equipment. According to U.S. Pat. No. 5,750,466, the process for coating cottonseed consists essentially of the steps of: (a) spraying linter-bearing cottonseed with a coating consisting essentially of a hot, aqueous, gelatinized starch suspension, optionally containing one or more of the listed biologically related materials; (b) drying the starch suspension coated cottonseed to yield starch coated cottonseed; (c) disaggregating the starch coated cottonseed; and (d) cooling and storing the starch-coated cottonseed.

While these patents have advanced the state of the art of coating whole cottonseed, further improvements in handleability and digestibility would be desirable to make full use of whole cottonseed as a nutritive feed ingredient.

SUMMARY OF THE INVENTION

According to the invention, a process of treating whole cottonseed to improve the handleability and digestibility of the cottonseed is provided. In general, the process comprises the steps of: (a) adjusting the pH to equal or greater than eight of an aqueous composition having a sugar concentration of at least 5 percent by weight; and (b) applying the aqueous composition to whole cottonseed. According to a further aspect of the invention, the treatment process further comprises the step of drying the whole cottonseed after applying the aqueous composition.

According to a modification of the process, the process comprises the steps of: (a) applying an aqueous sugar composition having a sugar concentration of at least 5 percent by weight to the whole cottonseed; and (b) applying a basic aqueous solution having a pH equal to or greater than eight to the whole cottonseed. The sequential order in which these two steps are performed is not presently believed to be critical to the practice of the modified process.

According to yet another aspect of the invention, the treated whole cottonseed product of the process is used as a new feed ingredient for animal feed, particularly a ruminant.

These and other aspects of the invention will be apparent to a person of ordinary skill in the art upon reading the following detailed description of a presently preferred embodiment and best mode of practicing the invention.

DETAILED DESCRIPTION OF A PRESENTLY MOST PREFERRED EMBODIMENT AND BEST MODE

The present invention will be described by referring to examples of how the invention can be made and used. According to the invention, a process of treating whole cottonseed to improve the handleability and digestibility of the cottonseed is provided. The process generally comprises the steps of: (a) adjusting the pH to equal or greater than eight of an aqueous composition having a sugar concentration of at least 5 percent by weight; and (b) applying the aqueous composition to whole cottonseed.

Sugar Sources and Amounts

According to a presently most preferred embodiment of the invention, the aqueous composition comprises a sugar source selected from the group consisting of condensed molasses solubles, molasses, condensed whey solubles, condensed fermented corn extractives, condensed corn distillers solubles, brewers solubles, hemicellulose extract, glucose, and any mixture thereof. An alternative expression for a suitable sugar source is "molasses products" as defined by the Association of American Feed Control Officials. In general, these types of sugar sources have a sugar concentration of at least 6 percent by weight, which is another way of expressing the scope of a preferred embodiment of the invention. Other food bypassing products having sufficient sugar concentration can be used as sugar sources.

In general, more concentrated sugar sources are preferred, such as condensed molasses solubles, which have a sugar concentration of about 19 percent by weight. A higher sugar concentration reduces the amount of water applied to the whole cottonseed, improves the degree of coating of the whole cottonseed, and reduces the time required for the preferred additional drying step. A lower sugar concentration can be somewhat compensated for by the presence of other organic matter, such as carbohydrates and protein which may also help serve to coat the whole cottonseed and improve its handleability, but the sugar is believed to be important for improving the digestibility of the whole cottonseed.

According to a presently preferred embodiment of the invention, an effective amount of the aqueous composition is applied to the whole cottonseed to obtain a whole cottonseed product having least 2 percent by weight sugar. According to a presently most preferred embodiment of the invention, an effective amount of the aqueous composition is applied to obtain a whole cottonseed product having between 2 percent and 5 percent by weight sugar. Depending on sugar concentration of the aqueous composition, the aqueous composition is preferably applied at the rate of at least 5 percent by weight to whole cottonseed. Most preferably, the aqueous composition is applied at the rate of between 5 percent and 25 percent by weight to whole cottonseed.

Optional Ingredients in Aqueous Composition

According to another aspect of the invention, the aqueous composition may contain optional biologically active ingredients. Optional ingredients can include, for example, fats, vitamins, minerals, trace elements, veterinarian products for the prevention, control or eradication of disease, and growth stimulating factors. For example, the aqueous composition can comprise at least 5 percent by weight fat, such as lecithin.

Adjusting pH

The step of adjusting the pH preferably is accomplished by adding an effective amount of a base to the aqueous composition. The preferred range for the basic pH is between 8.0 and 9.0. A presently most preferred base for use in the process is calcium. According to one embodiment, the aqueous composition is applied to the whole cottonseed based on the rate of at least 0.2 percent by weight calcium hydroxide to whole cottonseed. More preferably, the aqueous composition is applied to the whole cottonseed based on the rate of between 0.2 percent and 2 percent by weight calcium hydroxide to whole cottonseed. It is to be understood, of course, that other basic materials can be used to adjust the pH of the aqueous composition.

Applying Step

The step of applying the basic aqueous sugar composition to the whole cottonseed most preferably comprises the step of spraying the aqueous solution onto whole cottonseed. This can be accomplished, for example, by using a conventional endless belt conveyor for moving whole cottonseed past conventional spraying equipment.

Additional Drying Step

According to the invention, the process of treating whole cottonseed preferably includes the additional step of drying the whole cottonseed after applying the aqueous composition. While air drying is possible, more preferably the drying step comprises the step of heating the treated whole cottonseed product to a material temperature of at least 120 degrees Fahrenheit for at least 10 minutes. However, sugar begins to caramelize at about 165 degrees Fahrenheit, so heating the treated whole cottonseed product to a higher material temperature should be avoided. For example, the treated whole cottonseed can be heated in an oven maintained at between 120 degrees Fahrenheit and 160 degrees Fahrenheit for between 10 minutes and 4 hours. The whole cottonseed can be moved through the oven for the drying step on a conventional endless conveyor belt. This drying step preferably reduces the moisture content of the treated whole cottonseed product to less than 12 percent by weight, and more preferably in the range of 5 percent to 12 percent by weight moisture. The drying step reduces undesirable growth of mold and fungi on the treated product. The dried treated whole cottonseed produced by this process then has a relatively hard, non-sticky "candied" coating, which improves the handleability and digestibility of the whole cottonseed.

EXAMPLES

Two products of a representative process of treating whole cottonseed according to the invention were tested for relative flowability, bulk density, and digestibility relative to untreated whole cottonseed: condensed whey solubles ("Whey") and condensed molasses solubles ("Molasses").

According to the invention, the pH of each aqueous compositions was adjusted to between 8.0 and 9.0 by adding a concentrated basic solution made with calcium hydroxide. ("Whey/Ca(OH)$_2$" and "Molasses/Ca(OH)$_2$").

For the purposes of evaluation and comparison, the pH of separate samples of each of the aqueous compositions was adjusted to between 2.5 and 3.0 by adding concentrated sulfuric acid ("Whey/$H_2SO_4$" and "Molasses/$H_2SO_4$").

After adjusting the pH, the aqueous compositions were sprayed onto whole cottonseed at the rate of 12 percent by weight to whole cottonseed, to result in a treated whole cottonseed product having a sugar concentration of about 2 percent by weight.

Each of the samples was then dried in an oven maintained at 180 degrees Fahrenheit for four hours to reduce the moisture content of the treated whole cottonseed product to less than 12 percent by weight.

Finally, a sample of the untreated whole cottonseed and a sample of each of the treated whole cottonseed products was tested. Each of the tests and the test results are discussed and summarized below.

"Relative Flowability"

Relative flowability of whole cottonseed treated and dried according to the invention relative to the flowability of untreated whole cottonseed was measured using variable bin width opening to a downward slide at 60 degree angle to the horizontal to simulate most milling operations. The following relative flowability measurements are representative of repeated measurements. As defined herein, relative percent "flowability" is based on the bin opening width for untreated whole cottonseed relative to the bin opening width for a treated and dried whole cottonseed.

TABLE 1

Relative Flowability

| Whole Cottonseed | Bin Opening Width (inches) | Relative % "Flowability" |
|---|---|---|
| Untreated | 6.31 | 100.0 |
| Whey/Ca(OH)$_2$ | 3.38 | 186.7 |
| Whey/H$_2$SO$_4$ | 3.50 | 180.3 |
| Molasses/Ca(OH)$_2$ | 4.13 | 152.8 |
| Molasses/H$_2$SO$_4$ | 5.00 | 126.2 |

In each case, the relative % flowability for treated whole cottonseed is substantially better than for untreated whole cottonseed.

Bulk Density

The bulk density of whole cottonseed treated according to the invention relative to the flowability of untreated whole cottonseed was measured. Untreated whole cottonseed has a bulk density of about 12.5 pounds per cubic foot. Whole cottonseed treated and dried according to the invention has an increased bulk density of about 14.4 pounds per cubic foot. If the treated and dried whole cottonseed is mechanically compressed, for example by rolling, the bulk density is further increased to about 16.2 pounds per cubic foot. In each case, the bulk density of the whole cottonseed samples treated and dried according to the invention had a substantially improved bulk density.

Digestibility

Digestibility of whole cottonseed treated according to the invention relative to untreated whole cottonseed was measured in situ using Dacron bag techniques for evaluation of rate and extent of digestion of dry matter ("DM") and crude protein ("CF"). Each of the various samples to be tested for digestibility was suspended in a Dacron bag in the rumen of fistulated high-producing dairy cows for times of 0, 2, 4, 8, 11, 24, 36, 48, 60, and 72 hours. Each of the various samples was tested in two different cows and for two repetitions to obtain four data points for each sample and digestion time. Untreated whole cottonseed sample was used according to the same testing procedures a control. The rate and extend of digestion of these components of the untreated and treated whole cottonseed samples was determined based on the disappearance of the measured components. The results of these digestibility measurements are summarized in Tables 2 and 3, which show the improved digestibility of the treated whole cottonseed according to the invention relative to untreated whole cottonseed.

TABLE 2

Least Squares Mean* Digestibility of Dry Matter

| Whole Cottonseed | 0 | 11 | 24 | 48 | 72 Hours |
|---|---|---|---|---|---|
| Untreated | 0% | 4.725% | 9.225% | 17.525% | 24.900% |
| Whey/Ca(OH)$_2$ | 0% | 9.025% | 15.200% | 26.250% | 35.525% |
| Whey/H$_2$SO$_4$ | 0% | 7.500% | 13.250% | 23.475% | 32.175% |
| Molasses/Ca(OH)$_2$ | 0% | 10.075% | 16.450% | 27.975% | 37.750% |
| Molasses/H$_2$SO$_4$ | 0% | 13.809% | 19.209% | 29.159% | 37.709% |

*Standard Error = 1.887

TABLE 3

Least Squares Mean* Digestibility of Crude Protein

| Whole Cottonseed | 0 | 11 | 24 | 48 | 72 Hours |
|---|---|---|---|---|---|
| Untreated | 0% | 11.350% | 16.575% | 25.500% | 32.650% |
| Whey/Ca(OH)$_2$ | 0% | 28.150% | 35.275% | 47.175% | 56.425% |
| Whey/H$_2$SO$_4$ | 0% | 15.725% | 22.725% | 33.350% | 43.950% |
| Molasses/Ca(OH)$_2$ | 0% | 33.800% | 39.625% | 49.875% | 58.200% |
| Molasses/H$_2$SO$_4$ | 0% | 35.482% | 43.582% | 50.682% | 55.282% |

*Standard Error = 5.481

Modified Process

According to a modification of the basic process, the process comprises the steps of: (a) applying an aqueous solution having a sugar concentration of at least 5 percent by weight to the whole cottonseed; and (b) applying an aqueous solution having a pH equal to or greater than eight to the whole cottonseed. The sequential order in which these two steps are performed is not presently believed to be critical to the practice of the modified process, although it is believed that applying the basic solution first would be preferred to provide better contact with the whole cottonseed. Although not yet actually tested, it is believed that the modified process would also be effective for improving the handleability and digestibility of whole cottonseed. A subsequent drying step is expected to be helpful for producing a dried "candied" coating on the whole cottonseed product.

Product by Process

The treated whole cottonseed produced by the processes according to the is intended to be used as a feed ingredient for use in animal feed, particularly ruminant feed. For example, a ruminant animal feed can be produced by a feed mill using a dried treated whole cottonseed product according to the process of the invention. A presently preferred composition of such a ruminant animal feed comprises at least 5 percent by weight of a dried treated whole cottonseed product according to the process of the invention, and preferably in the range of 5 percent to 15 percent by weight. Other ingredients in the animal feed would include grains, roughages, protein meal, minerals, oil seed meals, and additives to provide the ruminant with a nutritionally balanced diet.

Other uses of treated whole cottonseed product of the invention may be possible. For example, the improved handling characteristics are expected to be useful in processing and handling the whole cottonseed for use in crop planting. In this regard, the heating step is not expected to denature the whole cottonseeds.

Conclusion

The description of the specific example above does not necessarily point out what an infringement would be, but are to provide at least one explanation of how to make and use the invention. Numerous modifications and variations of the preferred embodiments can be made without departing from the scope and spirit of the invention. Thus, the limits of the invention and the bounds of the patent protection are measured by and defined by the following claims.

Having described the invention, what is claimed is:

1. A process of treating whole cottonseed to improve the handleability and digestibility of the cottonseed, the process comprising the steps of:
   (a) using an effective amount of calcium hydroxide to adjust the pH to equal or greater than eight of an aqueous composition having a sugar concentration of at least 5 percent by weight; and
   (b) applying the aqueous composition to whole cottonseed.

2. The process of treating whole cottonseed according to claim 1, wherein the aqueous composition comprises a sugar source selected from the group consisting of condensed molasses solubles, molasses, condensed whey solubles, condensed fermented corn extractives, condensed corn distillers solubles, brewers solubles, hemicellulose extract, glucose, and any mixture thereof.

3. The process of treating whole cottonseed according to claim 1, wherein the aqueous composition comprises molasses products.

4. The process of treating whole cottonseed according to claim 1, wherein the aqueous composition has a sugar concentration of at least 19 percent by weight.

5. The process of treating whole cottonseed according to claim 1, wherein the effective amount of the aqueous composition is applied to the whole cottonseed to obtain a whole cottonseed product having least 2 percent by weight sugar.

6. The process of treating whole cottonseed according to claim 1, wherein an effective amount of the aqueous composition is applied to obtain a whole cottonseed product having between 2 percent and 5 percent by weight sugar.

7. The process of treating whole cottonseed according to claim 1, wherein the aqueous composition is applied at the rate of at least 5 percent by weight to whole cottonseed.

8. The process of treating whole cottonseed according to claim 1, wherein the aqueous composition is applied at the rate of between 5 percent and 25 percent by weight to whole cottonseed.

9. The process of treating whole cottonseed according to claim 1, wherein the aqueous composition further comprises ingredients selected from the group consisting of: fats, vitamins, minerals, trace elements, veterinarian products for the prevention, control or eradication of disease, and growth stimulating factors.

10. The process of treating whole cottonseed according to claim 9, wherein the fat is lecithin.

11. The process of treating whole cottonseed according to claim 1, wherein the aqueous composition is applied to the whole cottonseed based on the rate of at least 0.2 percent by weight calcium hydroxide to whole cottonseed.

12. The process of treating whole cottonseed according to claim 1, wherein the aqueous composition is applied to the whole cottonseed based on the rate of between 0.2 percent and 2 percent by weight calcium hydroxide to whole cottonseed.

13. The process of treating whole cottonseed according to claim 1, wherein the step of applying the aqueous solution to whole cottonseed comprises the step of: spraying the aqueous solution onto whole cottonseed.

14. The process of treating whole cottonseed according to claim 1, further comprising the step of:
   drying the whole cottonseed after applying the aqueous composition.

15. The process of treating whole cottonseed according to claim 14, wherein the step of drying the whole cottonseed comprises the step of: heating the treated whole cottonseed product to a material temperature of at least 120 degrees Fahrenheit for at least 10 minutes.

16. The process of treating whole cottonseed according to claim 14, wherein the step of drying the whole cottonseed reduces the moisture content of the treated whole cottonseed product to less than 12 percent by weight.

17. The treated whole cottonseed produced by the process of claim 1.

18. An animal feed product comprising at least 5 percent of treated whole cottonseed produced by the process of claims 1.

19. A process of treating whole cottonseed to improve the handleability and digestibility of the cottonseed, the process comprising the steps of:
   (a) applying an aqueous sugar composition having a sugar concentration of at least 5 percent by weight to the whole cottonseed; and
   (b) applying a basic aqueous solution having a pH equal to or greater than eight to the whole cottonseed, wherein the basic aqueous solution comprises a calcium hydroxide solution and is applied to the whole cottonseed based on the rate of at least 0.2 percent by weight calcium hydroxide to whole cottonseed.

20. The process of treating whole cottonseed according to claim 19, wherein the step of applying an aqueous sugar composition to the whole cottonseed is performed before the step of applying a basic aqueous solution to the whole cottonseed.

21. The process of treating whole cottonseed according to claim 19, wherein the step of applying an aqueous sugar composition to the whole cottonseed is performed after the step of applying a basic aqueous solution.

22. The process of treating whole cottonseed according to claim 19, wherein the aqueous sugar composition comprises a sugar source selected from the group consisting of condensed molasses solubles, molasses, condensed whey solubles, condensed fermented corn extractives, condensed corn distillers solubles, brewers solubles, hemicellulose extract, glucose, and any mixture thereof.

23. The process of treating whole cottonseed according to claim 19, wherein the aqueous composition comprises molasses products.

24. The process of treating whole cottonseed according to claim 19, wherein the aqueous sugar composition has a sugar concentration of at least 19 percent by weight.

25. The process of treating whole cottonseed according to claim 19, wherein an effective amount of the aqueous composition is applied to the whole cottonseed to obtain a whole cottonseed product having least 2 percent by weight sugar.

26. The treated whole cottonseed produced by the process of claim 19.

27. An animal feed product comprising at least 5 percent of treated whole cottonseed produced by the process of claim 19.

* * * * *

UNITED STATES PATENT AND TRADEMARK OFFICE
CERTIFICATE OF CORRECTION

PATENT NO. : 6,051,269
DATED : April 18, 2000
INVENTOR(S) : Joseph M. Harris

It is certified that error appears in the above-identified patent and that said Letters Patent is hereby corrected as shown below:

Column 1,
Line 20, after "to" insert -- as --;

Column 5,
Line 65, change "CF" to -- CP --;

Column 6,
Line 5, delete "extend" and insert -- extent --; and
Line 56, after "the" insert -- invention --.

Signed and Sealed this

Twenty-seventh Day of November, 2001

Attest:

NICHOLAS P. GODICI
Attesting Officer    Acting Director of the United States Patent and Trademark Office